E. B. PERRINE.
PRESSURE ACTUATED PNEUMATIC TRANSMISSION APPARATUS.
APPLICATION FILED NOV. 4, 1915.

1,180,604.

Patented Apr. 25, 1916.
3 SHEETS—SHEET 2.

Witnesses:
Alex. Lagaard.
H. A. Bowman.

Inventor:
Emmett B. Perrine.
By F. A. Whiteley
his Attorney.

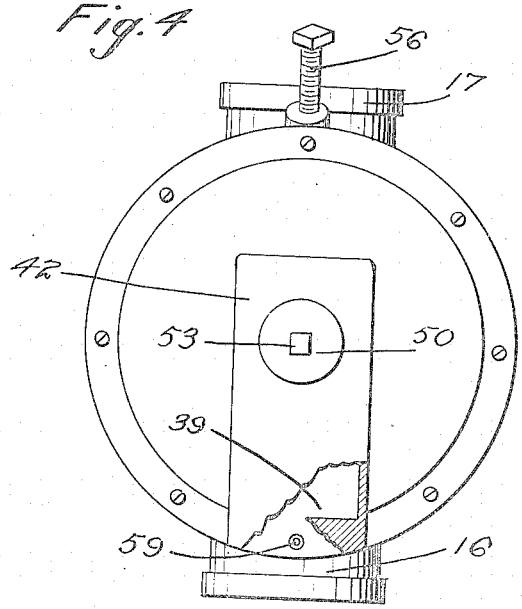
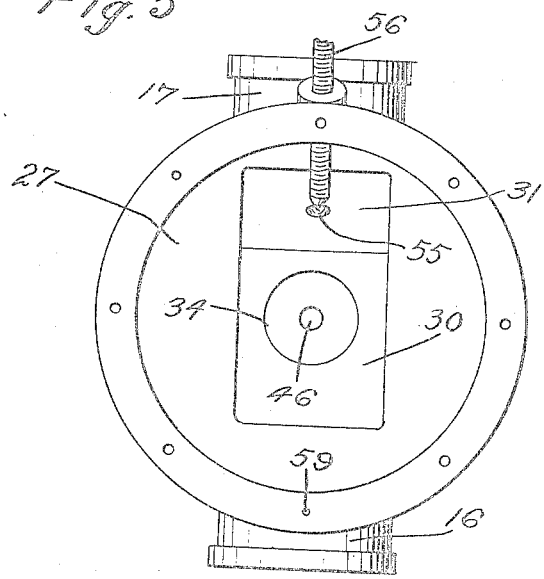

UNITED STATES PATENT OFFICE.

EMMETT B. PERRINE, OF MINNEAPOLIS, MINNESOTA.

PRESSURE-ACTUATED PNEUMATIC TRANSMISSION APPARATUS.

1,180,604.

Specification of Letters Patent.  Patented Apr. 25, 1916.

Application filed November 4, 1915. Serial No. 59,641.

*To all whom it may concern:*

Be it known that I, EMMETT B. PERRINE, a citizen of the United States, residing at Minneapolis, in the county of Hennepin and State of Minnesota, have invented certain new and useful Improvements in Pressure-Actuated Pneumatic Transmission Apparatus, of which the following is a specification.

My invention relates to pressure-actuated pneumatic transmission apparatus and has for its object to provide means controlled by the insertion of a carrier into the transmission tube for supplying the actuating medium such as compressed air to effect the movement of the carrier through the tube together with means for automatically cutting off the supply of such air after a predetermined lapse of time.

In carrying out my invention I provide a valve chamber having an obstructive portion subject at one side at all times to the full pressure of the atmosphere. The other side of said obstruction communicates with the transmission tube either through large openings sufficient to permit maximum flow of compressed air or through a small leak port. The means for closing the large openings comprises a diaphragm subject to the pressure in the carrier tube so that when a carrier is inserted in a tube, thereby closing the same to atmosphere, the leak will immediately build up a pressure on the inside of the diaphragm sufficient to cause the same to open the large ports and permit full flow of compressed air into the transmission tube, thereby driving the carrier through the tube. By means of auxiliary valves and small ports, alternatively opening to atmosphere or to the pressure area behind the obstruction, the pressure on both sides of the diaphragm is equalized. After the diaphragm has been operated spring means adapted normally to hold the diaphragm and valves in closed position will then operate to restore these parts to the normal position, this operation being accelerated by delivery of the carrier from the transmission tube, thus opening the same to atmosphere and tending to reduce pressure on the inside of the diaphragm.

The full objects and advantages of my invention will appear in connection with the detailed description thereof and are particularly pointed out in the claims.

Figure 1:
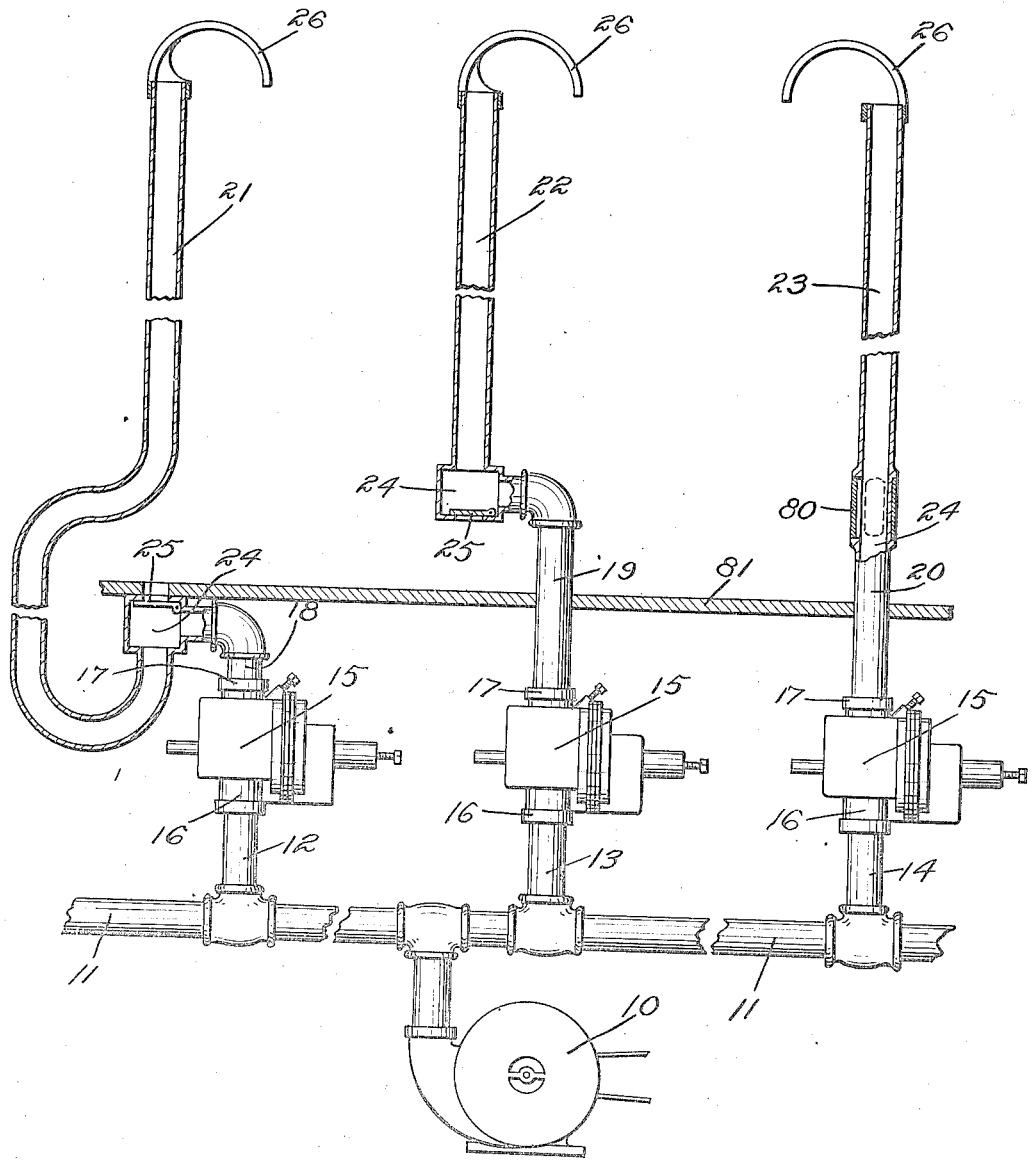
Figure 2:
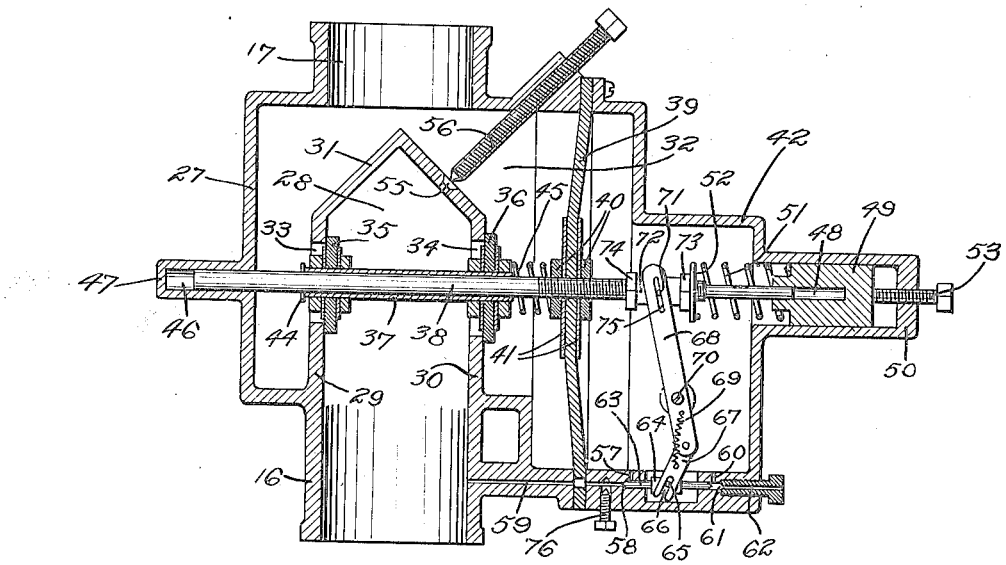
Figure 3:
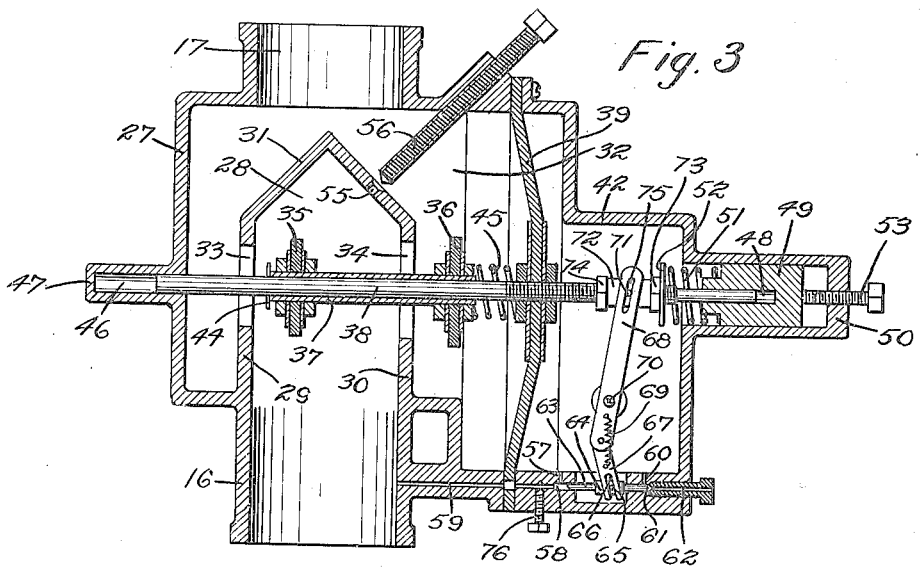

In the drawings, illustrating the application of my invention in one form, Figure 1 is a diagrammatic view of a despatch tube system showing the installation of my improved valve-actuating mechanism. Fig. 2 is a sectional elevational view of the valve-actuating mechanism shown in Fig. 1 drawn to a larger scale and showing the valves closed. Fig. 3 is a view of the same structure shown in Fig. 2 with the valves open and with the other parts in correspondingly altered positions. Fig. 4 is a side elevational view of the valve mechanism with parts cut away. Fig. 5 is a view similar to Fig. 4 with the cover and all the valve mechanism removed.

In Fig. 1 is shown a despatch tube system of ordinary construction which is especially adapted to send carriers from a central station to outlying service terminals. A compressed air pump 10 charges a trunk line 11 to which are connected various branch lines 12, 13 and 14. These lines, which I have designated as compression tubes, enter casings 15 at the inlets 16, and from outlets 17 of the same extend the pipes 18, 19 and 20 which communicate with the transmission or carrier tubes 21, 22 and 23. Each of these tubes is provided, as customary, with a chamber 24 having an inwardly-swinging door 25 through which the carrier is inserted, or a rotatable sleeve member 80 serving the same purpose, said chamber communicating directly with the various pipes 18, 19 and 20. Chamber 24 may be placed above or below the table 81, as shown in Fig. 1, as found most convenient. At the discharge ends, or the service terminals, of the individual tubes 21, 22 and 23 are situated goose-necks 26, which simply serve to direct the carriers after the same have left the tube.

When a carrier is inserted in a tube and the door 25 or sleeve 80 is closed, compressed air is supplied to cause the carrier to travel in the tube and discharge from the gooseneck 26 at the desired service terminal. My invention provides effectual and simple means for supplying the compressed air only after a carrier is inserted in the tube and for cutting off said air supply after a predetermined lapse of time so that a minimum amount of air is used, thus economizing on the pump capacity and the power used. The insertion of the carrier in the tube causes the operation of the valve hereinafter described by reason of the fact that the minimum flow of compressed air through the tube is thereby cut off, resulting in building up a pressure below the carrier inlet in the connecting tube and valve casing 15. It is this pressure which operates the valve mechanism admitting full flow of compressed air to the transmission tube, and in order that the same may be quickly responsive, it is an important feature of my invention that the carrier entrance chamber 24 may be and is located in close proximity to the valve chamber 15. In ordinary practice the valve chambers will be located immediately below the table or desk 81, as indicated in Fig. 1, while the carrier admission doors may be just above or below said table, as desired, thus producing great rapidity of action coupled with economy of power, as will hereinafter appear.

Figs. 2 and 3 show the construction of the valve mechanism employed. The casing 15 comprises walls 27 forming an expanded chamber 32. A partition or obstructor having walls 29 and 30 extends within the chamber 32 formed by the walls 27 and is closed at the top by the roof member 31 forming an inner chamber 28, the outlet 17 also communicating with chamber 32 at the other side of the obstructor member 29 from inlet 16. Valve openings 33 and 34 are formed in opposite side walls of the obstructor member 29 and are normally closed by balanced wall members 35 and 36, mounted on a sleeve 37. Opening 34 is substantially the same size as valve head 35, so that the pressure on the inner side of valve head 36 just counteracts the pressure on the outer side of valve head 35, thus requiring little force to move the same. This arrangement also permits of removal of the smaller valve head 35 from the device through the valve opening 34.

The sleeve 37 rides on a spindle 38 to which is attached a flexible diaphragm 39 by means of nuts 40 and washers 41, said diaphragm communicating with chamber 32. A cap 42 covers diaphragm 39 on one side and serves to secure it to the casing 27, forming a second chamber 43 on the other side of said diaphragm. Sleeve 37 is held in place upon spindle 38 by means of a pin 44 and a spring 45 acting between valve head 36 and one of the nuts 40. Spindle 38 is slidably mounted to open and close the valves 33 and 34 in a bearing 46 formed in a boss 49 issuing from the casing 27, and in a similar bearing 48 formed in a block 49 slidably mounted in a hollow cylindrical boss 50 integral with the cap 42. A spring 51 seated in the end of block 49 and against a collar 52 on spindle 38 tends to forward said spindle and simultaneously seat both valve heads 35 and 36, the pressure of said spring being regulated through block 49 by means of a screw 53 in the end of boss 50.

The chamber 28 is constantly subjected to super-atmospheric air pressure, and as long as the valves 33 and 34 are closed chamber 32 and chamber 43 are both subjected to atmospheric pressure. In the normally-closed position of these valves, shown in Fig. 2, diaphragm 39 is deflected into chamber 32. The operation of valve heads 35 and 36 depends upon a small leakage port 55 in the roof 31 between chambers 28 and 32, the opening of which can be regulated from without the device by a screw 56. As only a small amount of compressed air leaks into chamber 32 from port 55, and from thence on into the open despatch tube 21 or 27, as the case may be, the pressure in said chamber is substantially atmospheric and not sufficient to deflect diaphragm 39 against the action of spring 51. As soon as a carrier has been inserted in the mouth of the respective despatch tube line, and the door 25 closed, chamber 24 in that line becomes closed and the pressure within it and the chamber 32 increases, due to the leakage through port 55. As soon as the pressure in chamber 32 has increased sufficiently to overcome the action of the spring 51 the diaphragm 39 is deflected and the valves 33 and 34 begin to open. This rapidly increases the pressure in chamber 32 to the full amount and the diaphragm 39 is deflected to its limit, completely opening said valves, thus forcing the receptacle along the respective carrier tube and out through the discharge end of the line.

The mechanism for closing valves 33 and 34 and returning the diaphragm 39 to its normal position is contained entirely within the cap 42 and is clearly shown in Figs. 2 and 3. Chamber 43 communicates through a port 57 through a valve opening 58 and through a port 59 with chamber 28. Chamber 43 also communicates through a port 60, a valve chamber 61 and a port 62 with the atmosphere. Valves 58 and 61 are in line and are arranged to be alternately opened or closed by a double-headed valve stem 63. On stem 63 is a block 64 having a pin 65 operating in a slot 66 in an arm 67 by means of which said stem is shifted. Arm 67 is pivotally attached to the end of a lever 68 and is connected therewith through a spring 69 in such a manner that said spring only tends to move arm 60 relatively to lever 68 when the same are angularly disposed to each other. Lever 68 is pivoted to the cap 42 at 70 and is itself oscillated thereon through a pin 71 in a block 72 adjustably positioned on the spindle 38 between nuts 73 and 74, said pin acting in a slot 75 in the end of said lever. It hence becomes evident that valve stem 63 is not shifted until the diaphragm 39 has substantially arrived at either of its extreme positions, as the lever 68 and arm 67 become alined only slightly in advance of said positions.

In the positions shown in Fig. 2 it will be noted that valve 58 is closed and chamber 43, through valve 61, in communication with the atmosphere. As soon as the diaphragm 39 has been deflected, due to the insertion of a carrier in the tube, and arrives at its extreme position the lever mechanism 68—67 will be shifted, as shown in Fig. 3. Here valve 61 is closed and valve 58 is open, closing chamber 43 to the atmosphere and opening it to chamber 28. For a period of time depending on the size of the opening of port 59 into valve 58, which may be regulated through a screw 76, air passes into chamber 43 until the pressure on both sides of the diaphragm 39 is practically equal. When this equalization takes place the diaphragm 39 is deflected into its normal position through spring 51, leaving the parts arranged as shown in Fig. 2 with valves 33 and 34 closed and chamber 43 again communicating only with the atmosphere.

If it should so happen that tube 21 was extremely long and that the carrier had not been delivered when the mechanism was restored to its normal condition, the presence of the same in the tube would immediately cause the diaphragm 39 to open valves 33 and 34 and the same operations would take place over again. They would, however, be repeated continuously as long as a carrier was within the tube and they occur so quickly that no change of speed or stoppage of the same could be detected.

The advantages of my device are that carriers cannot get stalled in a tube, that the valve mechanisms are situated in locality with the pumps and trunk lines where they are out of the way and obscure, that the device requires only a small amount of energy to operate when not in use, and that the construction and installation of the same are exceedingly simple and inexpensive, thus rendering the same adaptable to the form of system described.

I claim:

1. In combination with the transmission tube and pressure tube of a pressure-actuated pneumatic transmission apparatus, a valve casing having connection at one side with the pressure tube and at the other side with the transmission tube, an obstruction in said valve casing having two sets of openings, one to permit minimum and the other maximum flow from the compression tube, a diaphragm subject to the pressure of the transmission tube, a valve connected with said diaphragm for closing the major opening, the opening permitting minimum flow being at all times operative, and means permitting insertion of a carrier into the transmission tube whereby the same will be closed to atmosphere and the air passing through the small opening at the rear of said carrier will build up a pressure and cause the diaphragm to open the valve.

2. In combination with a transmission tube and pressure tube of a pressure-actuated pneumatic transmission apparatus, a pressure generator, a valve casing in close proximity with said pressure generator having connection at one side with the pressure tube and at the other side with the transmission tube, an obstruction in said valve casing having a normally-closed opening adapted to permit maximum flow from the compression tube and a continuously unobstructed opening to permit minimum flow from the compression tube to the transmission tube, a diaphragm subject to the pressure of the transmission tube, a valve connected with said diaphragm, means for holding the diaphragm and valve so that the latter normally closes said major opening, and means located close to the valve for permitting insertion of a carrier into the transmission tube whereby the same will be closed to atmosphere and the air passing through the small opening at the rear of said carrier will quickly build up a pressure and cause the diaphragm to open the valve.

3. In combination with a transmission tube and pressure tube of a pressure-actuated pneumatic transmission apparatus, a valve casing having connection at one side with the pressure tube and at the other side with the transmission tube, an obstruction in said valve casing having a normally-closed opening adapted to permit maximum flow from the compression tube and a continuously unobstructed opening to permit minimum flow from the compression tube to the transmission tube, a diaphragm subject to the pressure of the transmission tube, a valve connected with said diaphragm, means for holding the diaphragm and valve so that the latter normally closes said major opening, and means located close to the valve for permitting insertion of a carrier into the transmission tube whereby the same will be closed to atmosphere and the air passing through the small opening at the rear of said carrier will quickly build up a pressure and cause the diaphragm to open the valve.

4. In combination with a transmission tube and pressure tube of a pressure-actuated pneumatic transmission apparatus, a valve casing having a partition extending therein and having connection at one side of said partition with the pressure tube and at the other side with the transmission tube, said partition having an opening adapted to permit continuous minimum flow from the compression tube to the transmission tube and a normally-closed opening adapted to permit intermittent maximum flow of air, a diaphragm extending across a portion of the chamber within the casing on the transmission tube side of the partition and subject at one side to the pressure of the transmission tube, means normally admitting atmospheric pressure to the other side of the diaphragm, a valve connected with said diaphragm, means for holding the diaphragm and valve so that the latter normally closes the major opening, and means permitting the insertion of a carrier into the transmission tube whereby the same will be closed to atmosphere and the air passing through a small opening at the rear of said carrier will build up a pressure and cause the diaphragm to open the valve.

5. In combination with a transmission tube and pressure tube of a pressure-actuated pneumatic transmission apparatus, a valve casing having a partition extending therein and having connection at one side of said partition with the pressure tube and at the other side with the transmission tube, said partition having an opening adapted to permit continuous minimum flow from the compression tube to the transmission tube and a normally-closed opening adapted to permit intermittent maximum flow of air, a diaphragm extending across a portion of the chamber within the casing on the transmission tube side of the partition and subject at one side to the pressure of the transmission tube, and means operated by movement of the diaphragm to close the portion of the chamber at the rear thereof to atmospheric pressure and open it to pressure of the pressure tube.

6. In combination with a transmission tube and pressure tube of a pressure-actuated pneumatic transmission apparatus, a valve casing having a main portion directly connected with said transmission and pressure tubes respectively and having a valved partition between said connections, said casing portion being provided with an expanded circular aperture at one side and having a small opening leading directly from the connection with the pressure tube to the surface of the rim surrounding said major opening, a diaphragm closing said opening and having an aperture registering with said last-named small aperture, said diaphragm controlling the valve on said partition, and a cap secured outside of said diaphragm and closing the valve chamber, said cap having a portion formed with alining openings, one of which communicates through the aperture in the diaphragm with said small aperture and the other of which goes to atmosphere, and a valve member controlled by means of the diaphragm for closing one or the other of the last-named apertures.

In testimony whereof I affix my signature in presence of two witnesses.

EMMETT B. PERRINE.

Witnesses:
F. A. WHITELEY,
H. A. BOWMAN.

Copies of this patent may be obtained for five cents each, by addressing the "Commissioner of Patents, Washington, D. C."